No. 702,490. Patented June 17, 1902.
R. SEEMAN.
APPARATUS FOR TREATING COPPER ORES.
(Application filed Apr. 24, 1901.)
(No Model.)
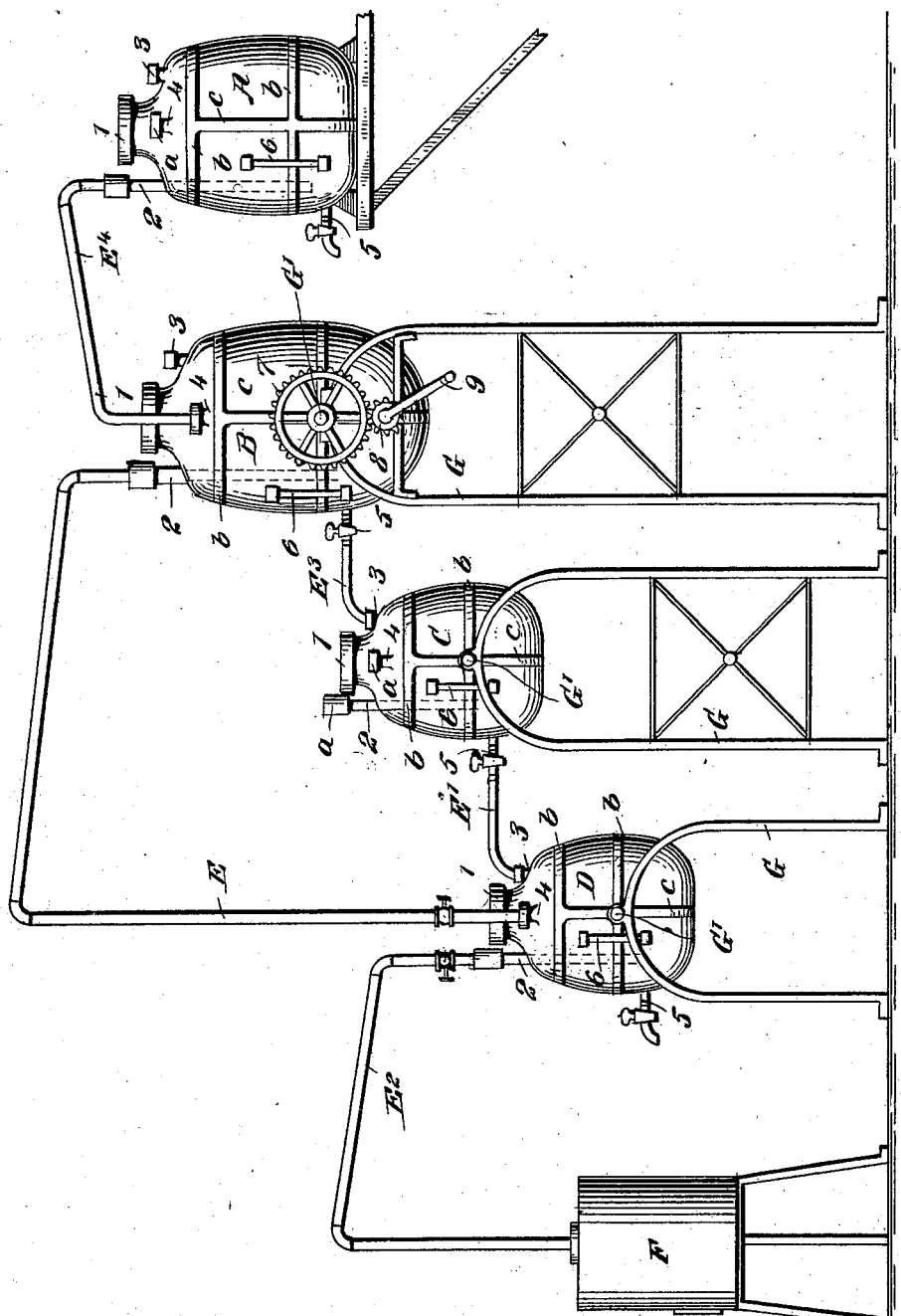
WITNESSES:
H. Walker
John Lotka
INVENTOR
Richard Seeman
BY
ATTORNEYS

UNITED STATES PATENT OFFICE.

RICHARD SEEMAN, OF EALING, LONDON, ENGLAND.

APPARATUS FOR TREATING COPPER ORES.

SPECIFICATION forming part of Letters Patent No. 702,490, dated June 17, 1902.

Application filed April 24, 1901. Serial No. 57,254. (No model.)

*To all whom it may concern:*

Be it known that I, RICHARD SEEMAN, a subject of the King of Great Britain and Ireland, and a resident of Ealing, London, in the county of Middlesex, England, have invented a new and Improved Apparatus for Treating Copper Ores, of which the following is a full, clear, and exact description.

My invention relates to the treatment of copper ores containing carbonate or oxid of copper by leaching them with ammonia.

The object of my invention is to provide an apparatus for carrying out this extraction upon a commercial scale and to avoid the drawbacks hitherto experienced when working on the same principle. The failure of former attempts I attribute largely to the unsuitability of the plant employed. An important requirement for the success of the extraction is that all vessels or connections which come in contact with the ammoniacal solution of copper should be made of or lined with some material not acted upon by this solution, as earthenware or glass.

The procedure and the apparatus for carrying it out will now be described in detail and the features of novelty pointed out in the claims.

Reference is to be had to the accompanying drawing, which is a perspective view of a plant constructed according to my invention.

The apparatus comprises a safety vessel A, a mixer B, a settler C, a still D, and a boiler F. The four receptacles A B C D may be alike, each consisting of a strong body adapted to be closed hermetically and provided at its top with a central filling-opening adapted to be closed by a cap 1, and three side nipples 2 3 4, adapted to be closed by plugs or caps, as $a$, or to receive the ends of connecting-pipes, as will be described presently. Each receptacle may be strengthened by horizontal ribs or bands $b$, extending around the same, and by a vertical rib or band $c$. Further, each receptacle has a drain passage or outlet 5 and a gage-glass or inspection-glass 6. The safety-receptacle A is stationary; but the other receptacles B C D are preferably provided with trunnions G′, journaled in supports or standards G, and on one of said trunnions may be secured a gear-wheel 7, engaging a driving-pinion 8, which may be turned by means of a crank 9. Each receptacle B C D may thus (when disconnected from the other parts of the apparatus) be rotated, rocked, or tilted on its trunnions. The receptacles B C D are preferably located at different levels, so that the liquid can flow from the mixer B to the settler C and then to the still D by gravity. The connections of the receptacles are as follows: The nipple 4 of the still D is connected by a pipe E with the nipple 2 of the mixer B, reaching down in the latter to a point near the bottom. The nipple 3 of the still is connected with the drain-passage 5 of the settler C by a pipe E′. The nipple 2 of the still is connected by a pipe $E^2$ with the boiler F. A pipe $E^3$ connects the nipple 3 of the settler C with the outlet 5 of the mixer B, and a pipe $E^4$ leads from the nipple 4 of the mixer B to the nipple 2 of the safety vessel A. The nipples not mentioned, as well as the filling-openings having the caps 1, are closed during the normal operation of the plant, except the nipple 3 on the safety vessel A.

The safety vessel is partly filled with water, into which dips the pipe $E^4$ to give vent to any excess of pressure in the mixer.

The mixer B, being disconnected from the rest of the apparatus, is charged with the powdered ore, ammonia and water being added in proportion to the quantity of copper contained in the ore as carbonate, the central opening and the nipple 4 being used for this purpose, after which they are to be conveniently closed. The mixer is then set revolving, for which purpose the gear-wheels 7 8 or fly-wheels may be employed. When the ore is sufficiently leached, the mixer is allowed to rest, the tailings settling at the bottom and the ammoniacal solution of copper resting on the top.

The settler C receives the ammoniacal solution from the mixer B, after they have been connected again, through the pipe $E^3$ and one of the nipples at the top—say 3—another, 4, acting as a vent-hole and the others being closed. The solution is allowed to remain in this vessel till further freed from solid impurities. When necessary, the sediment is drawn off after having been agitated by revolving the vessel, which much assists the cleaning out. Of course the settler is disconnected to allow it to be revolved.

The still D receives the liquid from the settler C through the pipe E'. Steam is then injected through the pipe $E^2$, which leads to about the level of tap 5 on the still. A filter-tank may be used between settler and still. The injection of steam into the still causes the ammonia to become free and cupric oxid to be deposited at the bottom. Direct heat or other means may be employed to accomplish the same object.

The ammonia-vapors are conducted back into the mixer B by the pipe E. This pipe must be made long enough to cool the vapors sufficiently to prevent their raising the liquid in the mixer to too high a temperature, or instead of lengthening the pipe a Liebig or other condenser may be employed in connection with this pipe. The tailings have in the meantime been discharged through the central opening of the mixer B after having been washed to save the ammonia left in them, and the mixer has been filled with fresh ore and water. The process is then carried on as before, except that the ammonia will be introduced into the mixer in the form of vapor from the still, commercial liquid ammonia being added, if required, through the central opening of the mixer, or, preferably, through the nipple 4, in order to proportion the supply of ammonia to the charge of ore.

When the blue ammoniacal solution in the still has become colorless by the application of heat, the ammonia will have been driven off into the mixer and cupric oxid deposited at the bottom of the still. The water which is left in the still is then drawn off through tap 5 and the cupric oxid removed through the central opening by revolving the still, the cap 1 being removed. This has the advantage of removing any cupric oxid from the sides of the vessel, where it has a tendency to adhere. The water from the still may be used again for the mixer or boiler, thus saving any ammonia which may be left.

Instead of conducting the ammonia-vapors back into the mixer they may be condensed in a coil in the usual method, and the resulting aqueous solution of ammonia can then be stored in a vessel for use when wanted.

The residue in the mixer may contain copper sulfid or other metals of value, which can now be dealt with and recovered by any known process, such as concentration or smelting.

The process may also be conducted in vessels which are stationary, they having an opening at the bottom conveniently closed when not wanted, and the mixture of the ore with the water and ammonia in the mixer may be accomplished by stirrers or any other mechanical means, or the mixer alone may revolve. When the liquid in the still has become colorless, the injection of steam is stopped by closing a cock in the pipe $E^2$ near the still at the same time the caps in the pipe E and $E^4$ are closed, so as to prevent a back rush, and as soon as the heat of the boiler allows it air should be let into the same by opening a valve unless the stream is led into another channel, for it will be readily understood that a single boiler may supply two or more sets of apparatus such as shown.

Any uncondensed ammonia passing into the pipe $E^4$ will be absorbed by the water in the safety vessel A, which water may be used for recharging the mixer or filling the boiler. Air displaced in the apparatus by the steam will pass through the water in the safety vessel A and will pass out through the open nipple 3. The safety vessel may be dispensed with, but it is preferable to use it.

While I have referred to the fact that the vessels or receptacles, as well as the connections which come in contact with the ammoniacal solution of copper, should be made of or lined with an inert material, I may add that in practice the cocks or taps may be made of brass, and the pipe E, which does not come in contact with the ammoniated solution, but with ammonia-vapors, may be made of iron.

Having thus described my invention, I claim as new and desire to secure by Letters Patent—

1. A plant for the treating of copper ores containing carbonate or oxid of copper, consisting of a series of vessels comprising a mixer, a settler, a still, and a safety vessel, the mixer, settler and still being located at different levels, the several vessels being pipe-connected and the parts of the apparatus with which the ammoniacal solution of copper comes in contact being of a material indestructible by such solution.

2. A plant for the treatment of ores, consisting of a stationary safety vessel, a mixer revolubly mounted, a pipe leading from the top of the mixer down into the safety vessel, a settler at a lower level than the mixer revolubly mounted, a pipe leading from the top of the settler to the lower portion of the mixer, a still at a lower level than the settler and revolubly mounted, a pipe leading from the top of the still to the lower portion of the settler, a pipe leading from the top of the still to the mixer and extending down into the same, a boiler, and a pipe leading from the top of the boiler to the still and extending down into the same, substantially as herein shown and described.

3. A plant for the treatment of ores, comprising a safety vessel, a mixer revolubly mounted, a pipe leading from the top of the mixer down into the safety vessel, a settler at a lower level than the mixer and revolubly mounted, a pipe leading from the top of the settler to the lower portion of the mixer, a still at a lower level than the settler and revolubly mounted, a pipe leading from the top of the still to the lower portion of the settler, and a pipe leading from the top of the still to the mixer and extending down into the same, substantially as herein shown and described.

4. A plant for the treatment of ores, comprising a safety vessel, a mixer revolubly mounted, a settler revolubly mounted at a lower level than the mixer, and a still revolubly mounted at a lower level than the settler, and pipes connecting the several vessels together, the portions of the several vessels and pipes with which the ammoniacal solution of copper comes in contact being of material indestructible by such solution, as set forth.

5. A plant for the treatment of ores, comprising a safety vessel, a mixer revolubly mounted, a pipe leading from the top of the mixer down into the safety vessel, a settler revolubly mounted at a lower level than the mixer, a pipe leading from the top of the settler to the lower portion of the mixer, a still revolubly mounted at a lower level than the settler, a pipe leading from the top of the still to the lower portion of the settler, and a pipe leading from the top of the still down into the mixer, the several vessels and the pipes being of acid-resisting material, as set forth.

In testimony whereof I have signed my name to this specification in the presence of two subscribing witnesses.

RICHARD SEEMAN.

Witnesses:
 GEO. P. SKELSEY,
 EUSTACE H. BARKER.